(12) United States Patent
Lin

(10) Patent No.: US 6,856,509 B2
(45) Date of Patent: Feb. 15, 2005

(54) CARTRIDGE ASSEMBLY OF A WATER COOLED RADIATOR

(76) Inventor: Jen-Cheng Lin, 9 Fl., No. 786, Chung-Cheng Rd., Chung-Ho City, Taipei Hsien (TW)

( * ) Notice: Subject to any disclaimer, the term of this patent is extended or adjusted under 35 U.S.C. 154(b) by 57 days.

(21) Appl. No.: 10/618,974

(22) Filed: Jul. 14, 2003

(65) Prior Publication Data

US 2005/0013113 A1 Jan. 20, 2005

(51) Int. Cl.[7] ................................................. G06F 1/20
(52) U.S. Cl. ....................... 361/685; 361/700; 312/216; 165/104.33
(58) Field of Search ................................. 361/679–687, 361/723–727, 700; 312/223.1–223.6, 216; 62/259.2; 165/104.33, 80.3–80.4, 121–126

(56) References Cited

U.S. PATENT DOCUMENTS 6,587,343 B2 * 7/2003 Novotny et al. ............ 361/698
6,646,866 B2 * 11/2003 Kao ............................ 361/683
2004/0114324 A1 * 6/2004 Kusaka et al. .............. 361/687

* cited by examiner

*Primary Examiner*—Hung Van Duong
(74) *Attorney, Agent, or Firm*—William E. Pelton, Esq.

(57) ABSTRACT

A cartridge assembly of water cooled radiator is disclosed. The cartridge assembly can be installed in a computer through the standard drive bay, which includes a booster pump (30) and a water tank (20), interconnected by circulation piping (32). The circulation piping (32) is formed by an intake pipe (34) and a return pipe (36). A transparent window (14) is opened up at the front of face panel (102) for visually checking the water level in the water tank (20). This cartridge design of the water cooled radiator has the advantages of safe usage, harmonious design, and easy operability. For refilling the water tank (20), a design is used employing a lock-and-release mechanism, such that when pressure is applied on the push button (104), the water tank (20) and the face panel (102) will be forced out slightly relative to the immovable shell (10).

6 Claims, 5 Drawing Sheets

CARTRIDGE ASSEMBLY OF A WATER COOLED RADIATOR

BACKGROUND OF THE INVENTION

1. Field of the Invention

The present invention relates to a cartridge assembly of a water cooled for cooling a central processor in a computer, in particular to a water cooled radiator having a water tank and a booster pump concealed in cartridge shell for easy installation in a computer, having the advantages of safe usage, harmonious design, and easy operability.

2. Description of Related Arts

As the size of integrated circuits becomes smaller and smaller, the density of components being packed into an integrated circuit, on the contrast, continues to multiply. When the central processor of a computer, typically built with an integrated circuit, is enabled to perform internal computation, the operating temperature will rise sharply inside the computer casing if not properly controlled. The rising temperature is known to be the main cause for slowing down the operation speed of processors. After running for a prolonged time at excessively high temperature, such a processor may be burnt out or hardware errors may result. To solve the temperature problems, cooling fans and heat sinks are generally used to cool down the temperature of the central processor.

A more recent invention is the use of a water cooled radiator for effective control of the operating temperature of the central processor. The main idea is to make use of circulating water as a heat conduction medium for heat dissipation. The water-holding tank is installed externally and the piping is connected to the inside of the computer. As water circulates around the central processor, heat is absorbed around the central processor and inside the computer casing, but there are certain weaknesses in the structure of the water radiator design and these are mentioned below.

(1) As the water tank is mounted externally and attached to the computer by simple mechanical means, this may spoil the elegance and integrity of the computer shape. The exposed piping may also cause water leakage due to loosening of the connection or physical damage to the circulation piping; and (2) The condition of water in the water tank is hard to maintain, as dirt often settles at the tank base making it difficult to clean.

Accordingly, there is considerable room for further improvement on the design of the water cooled radiator.

SUMMARY OF THE INVENTION

The primary object of the present invention is to provide a cartridge assembly of a water cooled radiator used for cooling down the operating temperature central processor in a computer for safe usage, harmonious design, and easy operability.

To this end, the instrumentality of the present invention is to design a cartridge assembly containing a water tank and a booster pump within the external shell, with piping interconnecting between the water tank and the booster pump. The dimension of the shell can fit into a 5.25" drive of a desktop computer. The circulation piping of the water cooled radiator is formed by an intake pipe and a return pipe. The intake pipe is connected between the booster pump and the central processor, and the return pipe is connected between the central processor and water tank.

For refilling the water tank, a unique lock-and-release mechanism is used, by means of four first springs, a second spring, an anchoring plate, and a catch box, wherein each first spring is mounted respectively on one of four legs of the handles connecting between the end of the handle and the water tank;

the anchoring plate having a column in the center is fixed on the shell wall using the bottom portion thereof;

the second spring is mounted between the column of the anchoring plate and the back wall of the water tank; and the catch box is fixed on the shell wall using the bottom portion, having a front opening corresponding to the position of a protruding rod fixed on the back wall of the water tank.

With springs supporting the water tank, when pressure is applied on the push button, the water tank and the face panel will be forced out slightly relative to the immovable shell wall, thus exposing the plug on top of the water tank.

The secondary object of the present invention is to open up a transparent window on the face panel for visually checking the water level in the water tank. If the water level drops below a predetermined level, refilling with water is required to maintain the normal operation of the water cooled radiator.

The design of the present invention has the advantages of safe usage, harmonious appearance, and easy operability.

The features and structure of the present invention will be more clearly understood when taken in conjunction with the accompanying drawings.

DETAILED DESCRIPTION OF THE PREFERRED EMBODIMENT

Figure 1:
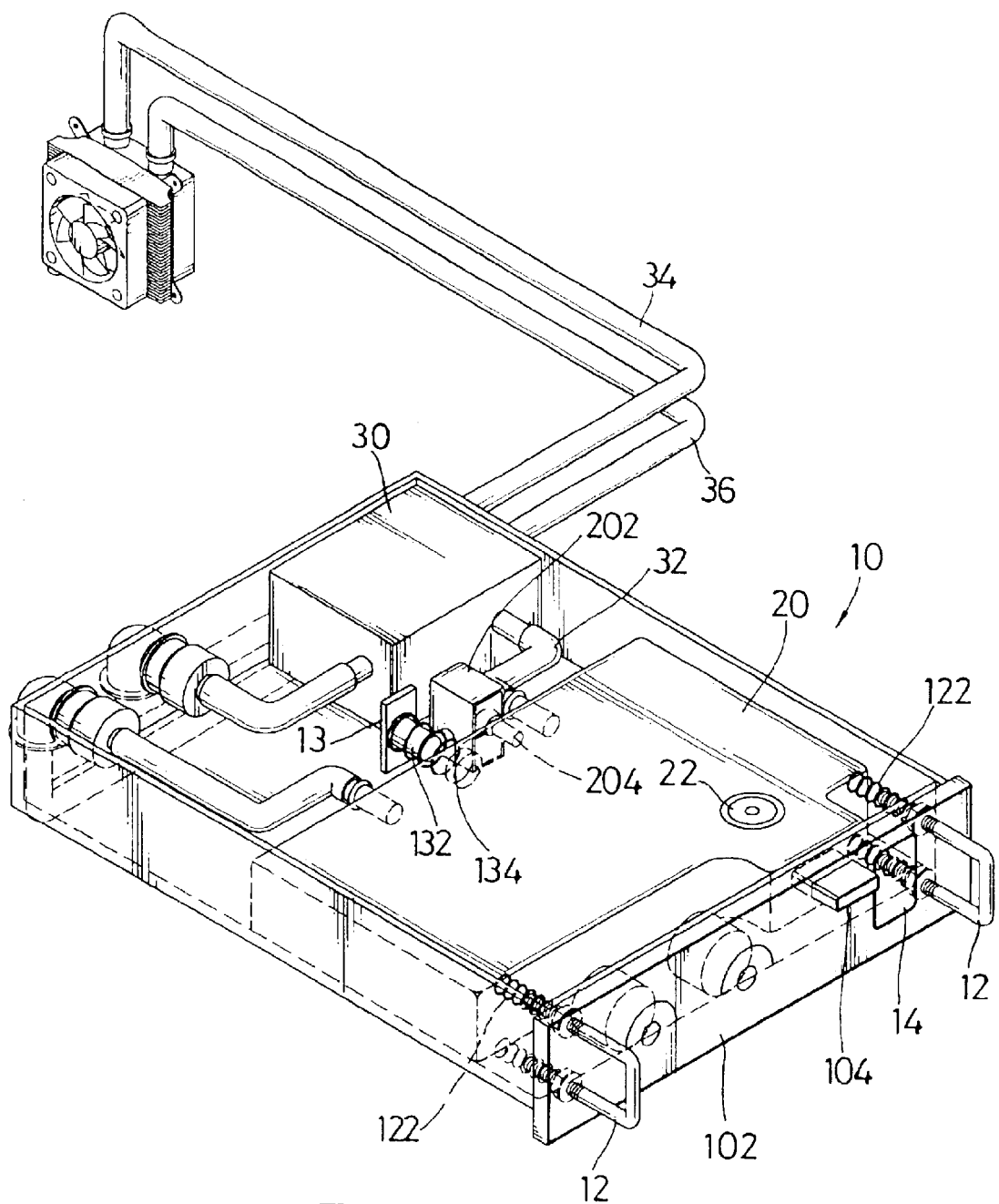
FIG. 1 is a perspective view of the present invention.
Figure 2:
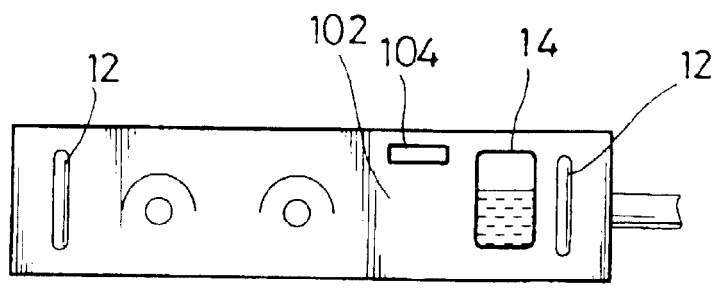
FIG. 2 is a front view of the face panel.
Figure 4:
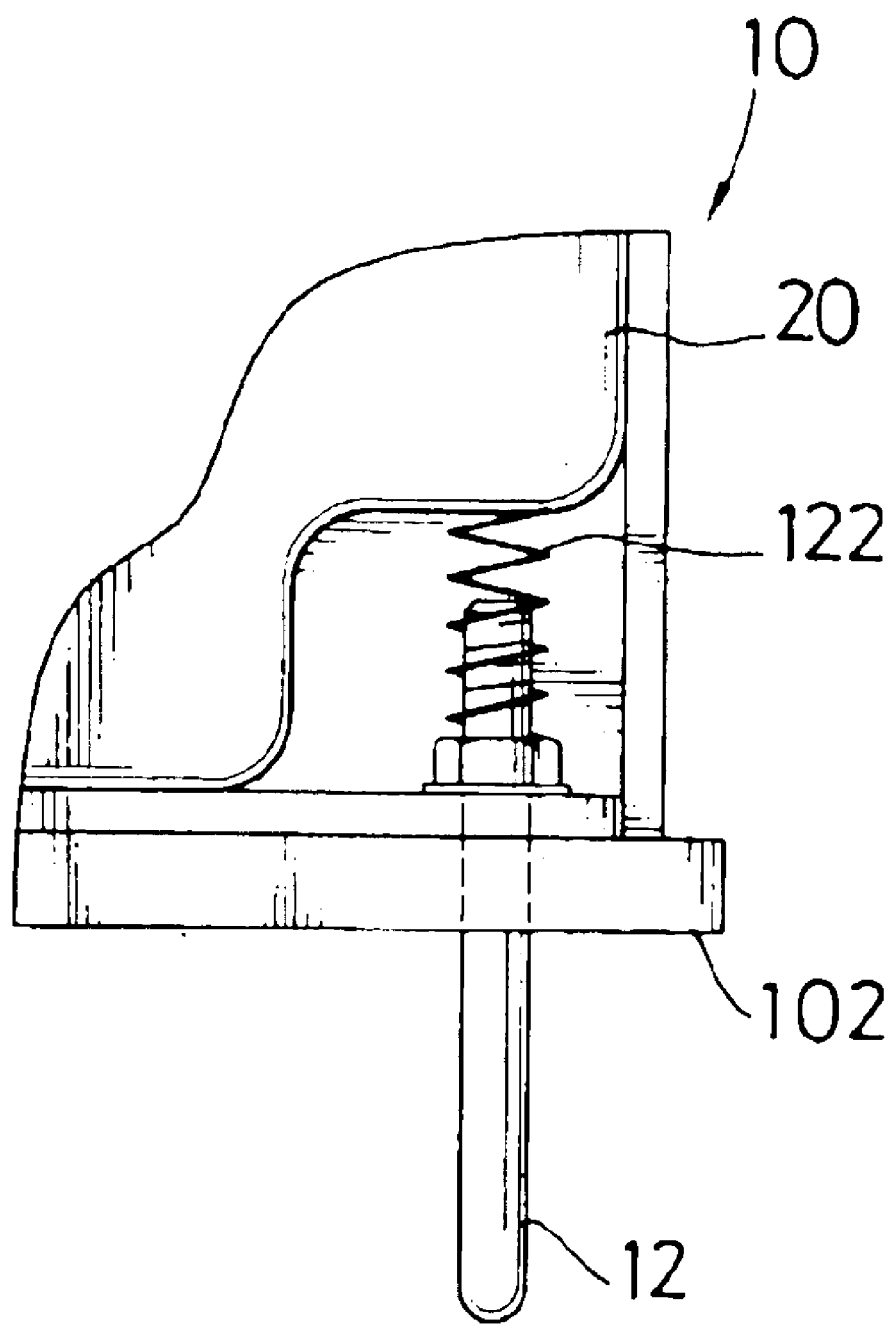
FIG. 4 is a partial enlargement of the handle and spring portion.

The present invention provides a cartridge assembly of a water cooled radiator as shown in FIG. 1, comprising:

an external shell (10) having a dimension that can fit into a 5.25" drive bay of the computer for easy installation into the computer, a water tank (20) being installed in the front portion of the cartridge inside the shell (10) for holding water, wherein the water tank (20) has a plug (22) on top that can be removed for refilling the water tank (20) with water;

a booster pump (30) for boosting the water pressure and being installed in the back portion of the cartridge behind the water tank (20) inside the shell (10), with piping (32) connecting between the booster pump (30) and the water tank (20); and a face panel (102) being installed at the front of the shell (10), as shown in FIG. 2, wherein the face panel (102) has a transparent window (14) for visually monitoring the water level in the water tank (20); if the water level is found below a predetermined level, it is necessary to replenish the water for normal operation of the water cooled radiator;

the face panel (102) has a push button (104), such that the back end of the push button (104) is fixed to the front wall of the water tank (20), leaving an appropriate gap between the front wall of the water tank (20) and the face panel (102); and the face panel (102) has two handles (12) respectively fitted on two sides, wherein each handle (12) is formed by an angular bend, and the back end of the handle (12) extends past the face panel (102) to the backside of the face panel (102), where a first spring is respectively mounted between one back end of the handle (12) and the water tank (20), as shown in FIG. 4.

Since the computer generally has a central processor at the hub, the temperature of the central processor will rise when performing internal computation. For a water cooled radiator, the circulation piping (32) extends into the computer casing to absorb internal heat around the central processor, forming an intake pipe (34) and a return pipe (36). The intake pipe (34) is used for directing inflow water between the booster pump (30) and the central processor, and the return pipe (36) is for directing return water between the water tank (20) and the central processor.

The present invention uses a number of unique designs. The front portion of the cartridge including the face panel and the water tank is designed to be movable, whilst the back portion including the booster pump and related piping can be conceived as the immovable portion. The push button on the face panel is used for triggering a lock-and-release mechanism to be mentioned below.

Figure 3:
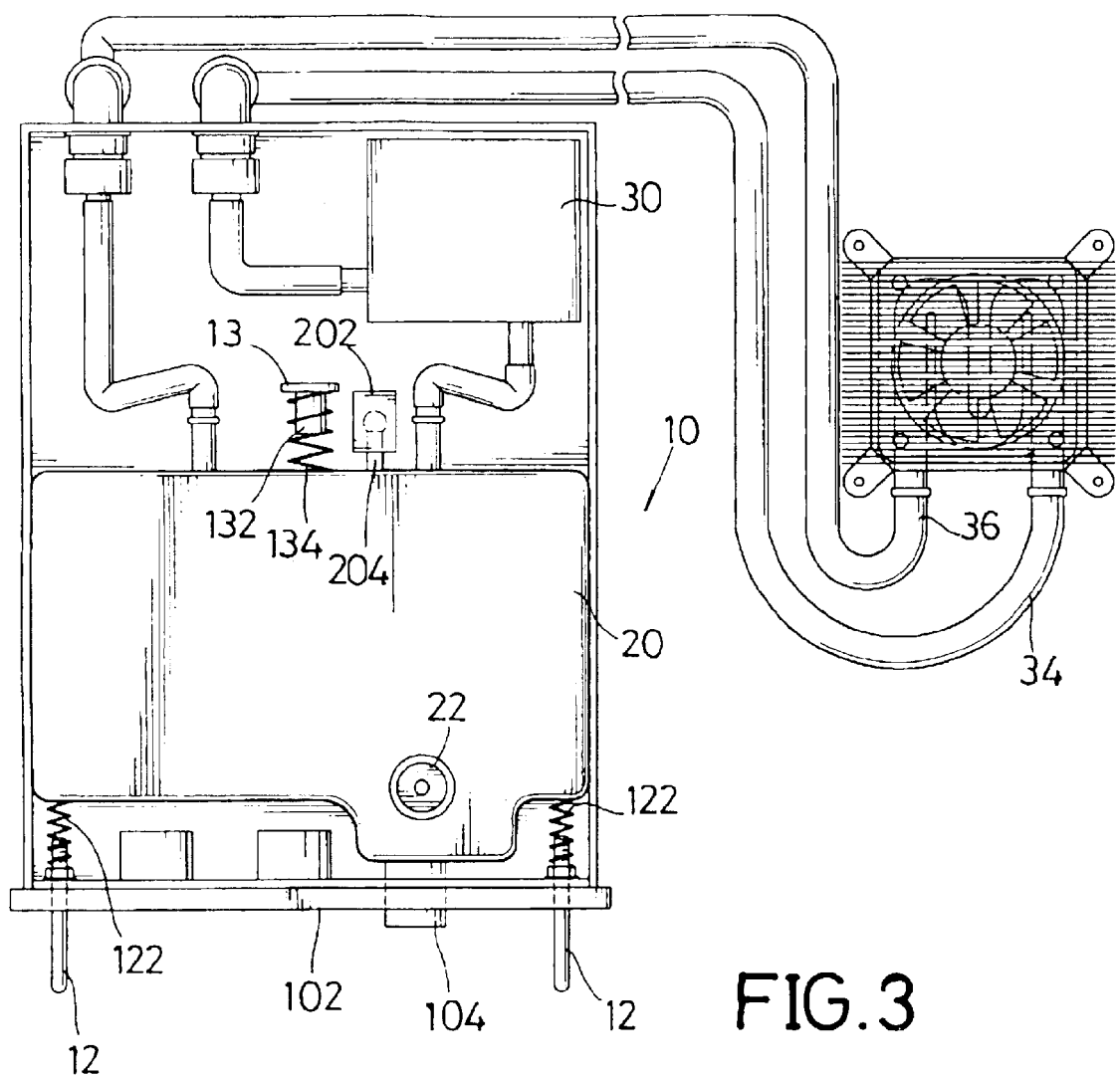
FIG. 3 is a top and plane view of the system architecture.

According to the present invention, a lock-and-release mechanism, as shown in FIG. 3, is employed to manage refilling of the water tank. The lock-and-release mechanism is orchestrated by the synchronized action of first springs (122) mounted between the water tank (20) and the face panel (102), a second spring (134) mounted between the water tank (20) and an anchoring plate (13), a catch box (202) fixed on the shell wall, and a push button (104) mounted on the face panel (102).

The anchoring plate (13) has a column (132) in the center and fixed on the shell wall using the bottom portion thereof, and the anchoring plate (13) is used for mounting a second spring (134) between the column (132) and the back wall of the water tank (20).

The catch box (202) has a front opening and is fixed on the shell wall using the bottom portion. The front opening corresponds to the position of a rod (204) protruding from the back end of the water tank (20). The rod (204) has a ball on the far end for engaging the catch box (202).

Figure 6:
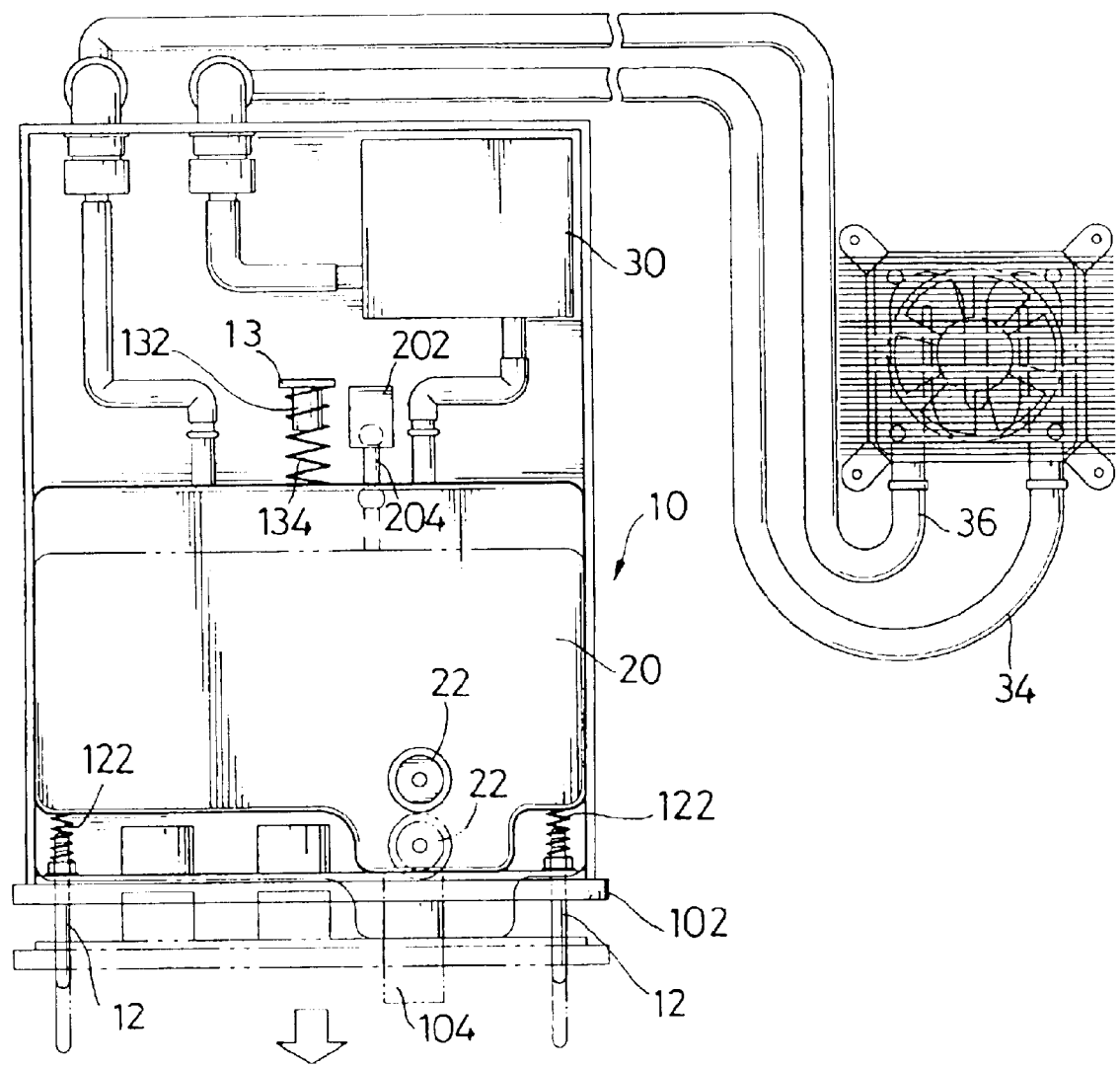
FIG. 6 is a top and plane view diagram depicting a mechanism for managing the refilling of the water tank in accordance with the present invention.

Pressing down the push button (104) the first time will cause the protruding rod (204) to push through the front opening of the catch box (202), and pressing the push button (104) the second time will cause the protruding rod (204) to retract and close off the front opening of catch box (202). As the above-mentioned action of the catch box (202) and the protruding rod (204) is taken from a known mechanical structure and operation principles, further details need not be provided. The operation of the lock-and-release mechanism in the cartridge assembly is diagrammatically illustrated in FIGS. 3 and 6.

The pressing down action generates a counter pressure on the second spring to a point will be able to offset the force by the four first springs, thus causing the face panel and the water tank to be pushed out slightly relative to the immovable shell, such that the plug on top the exposed water tank can be easily pulled out for refilling the water tank.

The transparent window in accordance with the present invention is designed for visually monitoring of the water level in the water tank. If the water level is below the predetermined level, it is necessary to replenish the water to maintain the normal cooling for the central processor.

Figure 5:
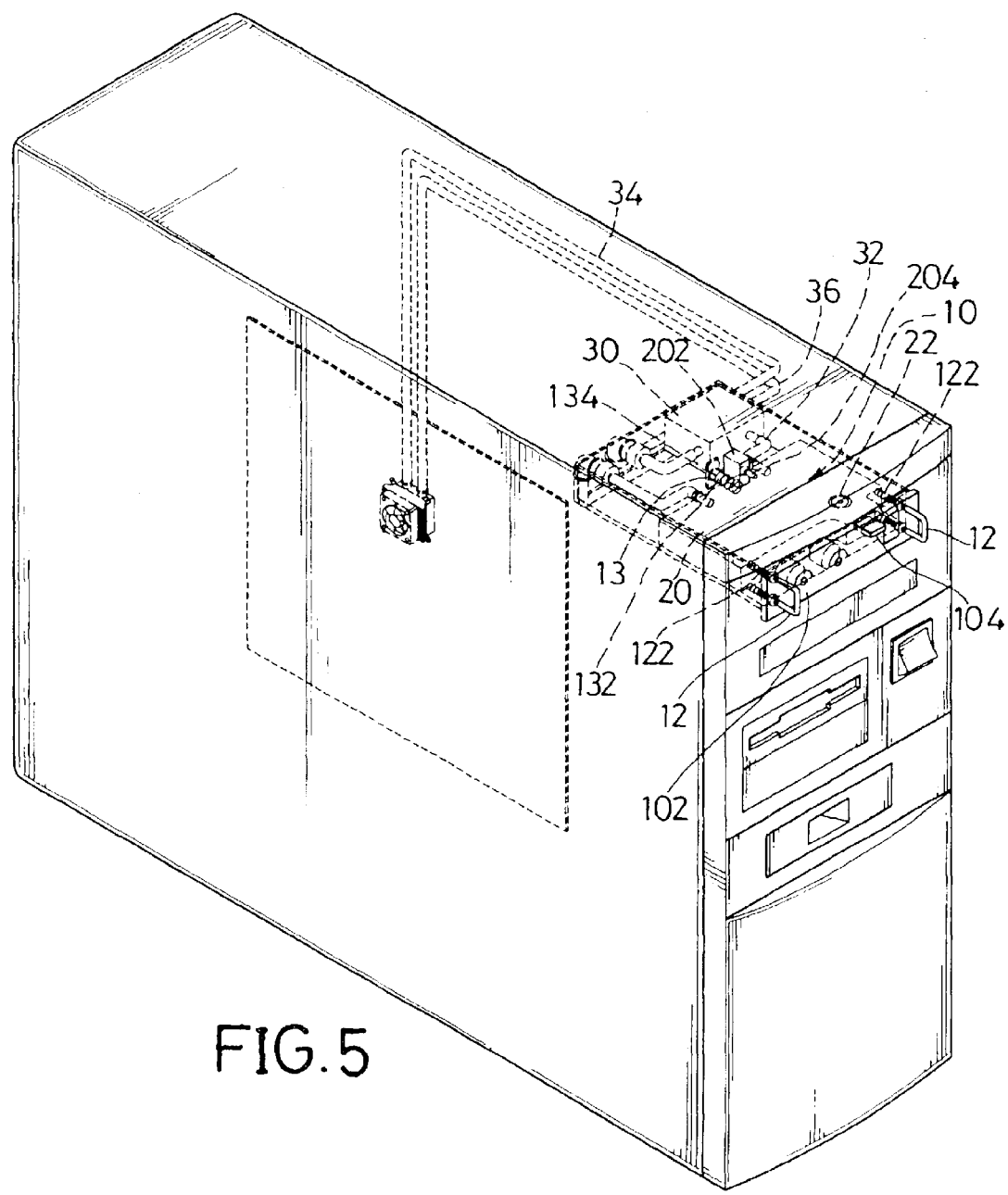
FIG. 5 is a perspective view of a preferred embodiment actually being installed in a computer.

In summary, the present invention, as implemented by the preferred embodiment shown in FIG. 5, provides a cartridge assembly of a water cooled radiator with a water tank and a booster pump concealed inside the external shell. The booster pump is connected by piping to the central processor in the computer, such that circulating water can be used as a medium to absorb the heat generated by the central processor and other components inside the computer. The internal heat can be systematically dissipated by a heat exchanger installed on the computer. The present invention has the advantages of safe usage, harmonious appearance, and easy operability.

The foregoing description of the preferred embodiments of the present invention is intended to be illustrative only and, under no circumstances, should the scope of the present invention be so restricted.

What is claimed is:

1. A cartridge assembly of a water cooled radiator for cooling a central processor in a computer, comprising:

a shell (10) with a face panel (102) of dimensions that can fit into a 5.25" drive bay of the computer front panel for easy installation into the computer;

a water tank (20) for holding water and being installed behind the face panel (102) inside the shell (10), wherein the water tank (20) has a plug (22) that can be removed for refilling the water tank with water;

a booster pump (30) being installed behind the water tank (20) inside the shell (10) for boosting water pressure, with piping (32) interconnecting between the booster pump (30) and water tank (20); wherein the cartridge assembly being connected by the circulation piping (32) into a casing of the computer to form an intake pipe (34) and a return pipe (36), wherein the intake pipe (34) is for directing inflow water between the booster pump (30) and the central processor, and the return pipe (36) is for directing return water between the water tank (20) and the central processor.

2. The cartridge assembly as claimed in claim 1, wherein the face panel (102) of the cartridge assembly has a transparent window (14) for visually monitoring of a water level in the water tank (20).

3. The cartridge assembly as claimed in claim 1, wherein the face panel (102) has a push button (104) with back end fixed to the front wall of the water tank (20), and two handles (12) are respectively mounted on two sides of the face panel (102), each handle (12) having an angular bend.

4. The cartridge assembly as claimed in claim 1, wherein the cartridge assembly has a lock-and-release mechanism to manage the refilling of the water tank (20), by means of four first springs (122), a second spring (134), an anchoring plate (13), and a catch box (202), wherein each first spring (122) is mounted on a respective one of four legs at the back end of each handle (12) connecting between the end of the handle (12) and the water tank (20);

the anchoring plate (13) having a column (132) in the center is fixed on the shell wall using the bottom portion for mounting the second spring (134);

the second spring (134) is mounted between the column (132) of the anchoring plate (13) and the back wall of the water tank (20); and the catch box (202) is fixed on the shell wall by using the bottom portion, and the catch box (202) has a front opening corresponding to the position of a protruding rod (204) fixed on the back wall of the water tank (20), the protruding rod (204) having a ball at a far end of the protruding rod (204).

5. The cartridge assembly as claimed in claim 2, wherein the cartridge assembly has a lock-and-release mechanism to manage the refilling of the water tank (20), by means of four first springs (122), a second spring (134), an anchoring plate (13), and a catch box (202), wherein each first spring (122) is mounted on a respective one of four legs at a back end of each handle (12) connecting between the handle (12) and the water tank (20);

the anchoring plate (13) having a column (132) in the center, the column (132) fixed on the shell wall using the bottom portion thereof for mounting the second spring (134);

the second spring (134) is mounted between the column (132) of the anchoring plate (13) and the water tank (20); and the catch box (202) is fixed on the shell wall by using the bottom portion, and the catch box (202) has a front opening corresponding to the position of a protruding rod (204) fixed on the back wall of the water tank (20), the protruding rod (204) having a ball at a far end of the protruding rod (204).

6. The cartridge assembly as claimed in claim 3, wherein the cartridge assembly has a lock-and-release mechanism to manage the refilling of the water tank (20), by means of four first springs (122), a second spring (134), an anchoring plate (13), and a catch box (202), wherein each first spring (122) is mounted on a respective one of four legs at the back end of each handle (12) connecting between the end of the handle (12) and the water tank (20);

the anchoring plate (13) having a column (132) in the center of the anchoring plate, wherein the column (132) is fixed on the shell wall using the bottom portion for mounting the second spring (134);

the second spring (134) is mounted between the column (132) of the anchoring plate (13) and the back wall of the water tank (20); and the catch box (202) is fixed on the shell wall using the bottom portion, and the catch box (202) has a front opening corresponding to the position of a protruding rod (204) fixed on the back wall of the water tank (20), the protruding rod (204) having a ball at a far end of the protruding rod (204).

\* \* \* \* \*